United States Patent [19]

Yamaguchi

[11] Patent Number: 5,607,371
[45] Date of Patent: Mar. 4, 1997

[54] FLUID PASSAGE ARRANGEMENT FOR CONTINUOUSLY VARIABLE TRANSMISSION

[75] Inventor: Toshio Yamaguchi, Hadano, Japan

[73] Assignee: Nissan Motor Co., Ltd., Yokohama, Japan

[21] Appl. No.: 406,303

[22] Filed: Mar. 17, 1995

[30] Foreign Application Priority Data

Mar. 17, 1994 [JP] Japan ................. 6-47461

[51] Int. Cl.$^6$ ................................. F16H 63/00
[52] U.S. Cl. ................ 475/210; 475/159; 474/28; 474/43
[58] Field of Search ................. 415/111, 112; 474/18, 28, 43; 475/159, 207, 210

[56] References Cited

U.S. PATENT DOCUMENTS

| | | | |
|---|---|---|---|
| 4,526,061 | 7/1985 | Sakakibara et al. | 474/28 |
| 4,722,718 | 2/1988 | Eugen | 474/28 |
| 5,368,528 | 11/1994 | Farrell | 475/159 X |
| 5,439,419 | 8/1995 | Yamada et al. | 474/18 |

FOREIGN PATENT DOCUMENTS

| | | | |
|---|---|---|---|
| 1-112076 | 4/1989 | Japan . | |
| 1283458 | 11/1989 | Japan | 474/43 |
| 2159446 | 6/1990 | Japan | 474/28 |
| 2278043 | 11/1990 | Japan | 475/159 |
| 483953 | 3/1992 | Japan | 475/210 |

*Primary Examiner*—Khoi Q. Ta
*Attorney, Agent, or Firm*—Foley & Lardner

[57] ABSTRACT

A continuously variable transmission of an automotive vehicle has a start assist device, a forward-reverse changeover device, and a V-belt type transmission. The changeover device has an input shaft for receiving power from the start assist device. The V-belt type transmission has a drive shaft connected to a drive pulley. The input shaft and the drive shaft are aligned along a common longitudinal central axis. A fluid passage arrangement for the transmission includes a hydraulic fluid passage for a chamber of the drive pulley, which passage includes mutually communicating axial holes formed in the input shaft and the drive shaft. One of the axial holes communicates with a hydraulic fluid supply, while the other axial hole communicates with the chamber. The fluid passage arrangement further has lubricating fluid passages for the transmission and the changeover device. These lubricating fluid passages are formed in radially outer peripheral portions with respect to the input shaft and extend axially along the input shaft.

4 Claims, 4 Drawing Sheets

FIG_3
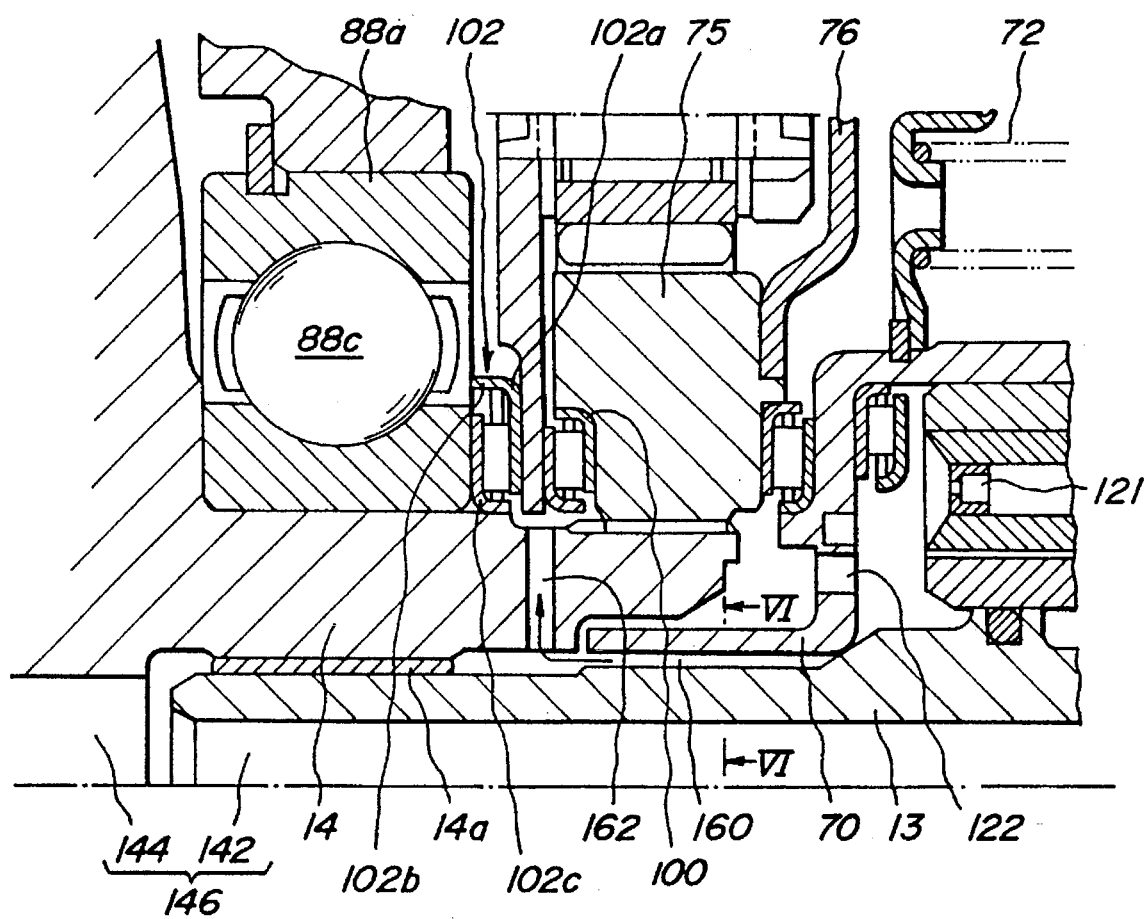

FIG._4
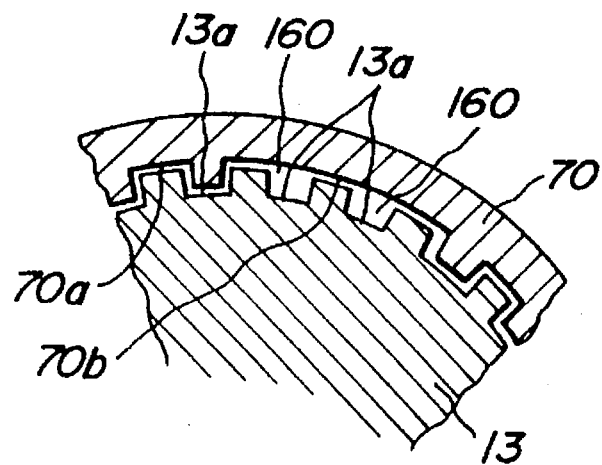
FIG._5
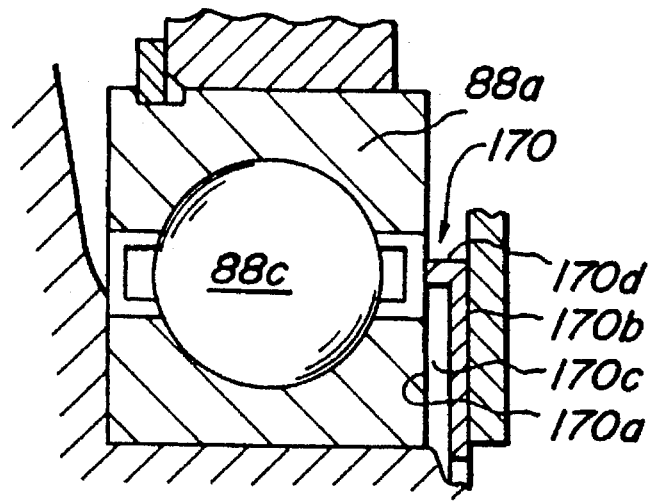

FLUID PASSAGE ARRANGEMENT FOR CONTINUOUSLY VARIABLE TRANSMISSION

BACKGROUND FOR THE INVENTION

1. Field of the Invention

The present invention generally relates to a continuously variable transmission of an automotive vehicle, which transmission comprising a V-belt type continuously variable transmission mechanism, a start assist device, a forward-reverse changeover device and a casing. More particularly, the invention relates to a fluid passage arrangement for the continuously variable transmission, which arrangement serving to supply pressurized hydraulic fluid and lubricating fluid to at least the transmission mechanism and the forward-reverse changeover device.

2. Description of the Related Art

A continuously variable transmission of the above-mentioned type is known from Japanese patent application laid open No. 1-112076, which patent application being filed by an applicant of the present application.

In the known continuously variable transmission, the V-belt type continuously variable transmission mechanism has a drive pulley, a driven pulley and an endless V-belt, each width of V-grooves of which pulleys being changeable for continuously varying a rotational speed ratio between the pulleys by supplying pressurized hydraulic fluid to actuate a piston in a hydraulic fluid chamber of at least the drive pulley, and between which drive and driven pulleys the V-belt being passed for transmitting power between the pulleys. The forward-reverse changeover device has a planetary gearing, a forward clutch, a reverse brake and an input shaft, which planetary gearing receiving rotational power from the start assist device through the input shaft and providing the rotational power to the drive pulley of the transmission mechanism through a drive shaft connected to and carrying the drive pulley, and which planetary gearing changing over a rotational direction of the drive shaft between the same and a counter direction relative to a rotational direction of the input shaft by selectively actuating the forward clutch or the reverse brake. The start assist device transmits rotational power between an engine as a power unit and the forward-reverse changeover device, allowing rotation of an output shaft of the engine despite of stop rotating condition of the input shaft.

The known continuously variable transmission further comprises a differential gearing device for driving front and/or rear wheels of an automotive vehicle, which differential gearing device being drivably connected to the driven pulley through a gearing. Thus, the continuously variable transmission is capable of transmitting rotational power from the engine to the wheels, with a desired rotational speed ratio and a desired rotational direction.

The transmission mechanism, the start assist device and the forward-reverse changeover device are contained in the casing. The casing consists of a housing, a casing body and a side cover, all of which being connected to each other by bolts. The housing contains the start assist device, while the casing body contains the continuously variable transmission mechanism and the forward-reverse changeover device in such a manner that the input shaft of the forward-reverse changeover device and the drive shaft of the drive pulley are aligned along a common longitudinal central axis, the drive shaft of the drive pulley and a driven shaft connected to and carrying the driven pulley are placed parallel to each other, the planetary gearing of the forward-reverse changeover device is placed in a radially outer peripheral space with respect to the input shaft, surrounding the input shaft, and the the drive shaft and the driven shaft are rotatably supported by the casing body. The side cover is placed at an opposed end of the casing with respect to the housing, rotatably supporting both of an end of the drive shaft of the drive pulley and an end of the driven shaft of the driven pulley.

The fluid passage arrangement, contained in the casing, includes hydraulic fluid passages for supplying pressurized hydraulic fluid into the hydraulic fluid chamber of the drive pulley, and lubricating fluid passages for supplying lubricating fluid into the forward-reverse changeover device.

The hydraulic fluid passages for the drive pulley are arranged in such a manner that a fluid passage is formed in a wall of the casing body and connected to a pressurized hydraulic fluid supply, a pipe as another fluid passage is fixed on a wall of the side cover at inside of the side cover and connected to the fluid passage in the wall of the casing body, an axial hole as another fluid passage is drilled in the drive shaft of the drive pulley and connected to the pipe on the side cover, and a through hole as another fluid passage is drilled in the drive shaft so that the through hole extends between the axial hole of the drive shaft and the hydraulic fluid chamber of the drive pulley.

The lubricating fluid passages for the forward-reverse changeover device are arranged in such a manner that an axial hole as a fluid passage is drilled in the input shaft and connected to a lubricating fluid supply, and a through hole as another fluid passage is drilled in the input shaft so that the through hole extends from the axial hole of the the input shaft toward the planetary gearing, the forward clutch and the reverse brake.

The fluid passage arrangement further includes other lubricating fluid passages for supplying lubricating fluid to many bearings, which bearings being provided for rotatably supporting the drive shaft and other rotational components of the forward-reverse changeover device and the transmission mechanism. However, the lubricating fluid passages for the bearings are arranged relatively complicatedly, accompanied with increased manufacturing cost.

Moreover, since the pipe as a hydraulic fluid passage is arranged at inside of the side cover, the side cover is bulged axially outwardly, so that the continuously variable transmission has a relatively large axial size, causing difficulty of mounting the transmission on a small size automotive vehicle.

SUMMARY OF THE INVENTION

It is therefore a primary object of the present invention to provide an improved fluid passage arrangement which enables to manufacture lubricating fluid passages simply with low cost, while maintaining satisfactory lubricatability, and which enables to consist a continuously variable transmission with smaller axial size.

To this end, the invention provides an improved fluid passage arrangement for a continuously variable transmission of an automotive vehicle, the transmission comprising a V-belt type continuously variable transmission mechanism, a start assist device, a forward-reverse changeover device and a casing; wherein, the V-belt type continuously variable transmission mechanism having a drive pulley, a driven pulley and an endless V-belt, each width of V-grooves of which pulleys being changeable for continuously varying a rotational speed ratio between the pulleys by supplying pressurized hydraulic fluid to actuate a piston in a hydraulic fluid chamber of at least the drive pulley, and between which drive and driven pulleys the V-belt being passed for transmitting power between the pulleys;

the forward-reverse changeover device having a planetary gearing, a forward clutch, a reverse brake and an input shaft, which planetary gearing receiving rotational power from the start assist device through the input shaft and providing the rotational power to the drive pulley of the transmission mechanism through a drive shaft connected to and carrying the drive pulley, and which planetary gearing changing over a rotational direction of the drive shaft between the same and a counter direction relative to a rotational direction of the input shaft by selectively actuating the forward clutch or the reverse brake;

the start assist device transmitting rotational power between an engine as a power unit and the forward-reverse changeover device, allowing rotation of an output shaft of the engine despite of stop rotating condition of the input shaft; and the casing containing the transmission mechanism, the start assist device and the forward-reverse changeover device in such a manner that the input shaft of the forward-reverse changeover device and the drive shaft of the drive pulley being aligned along a common longitudinal central axis;

while the fluid passage arrangement comprising hydraulic fluid passages for the drive pulley, and lubricating fluid passages for rotational components of the continuously variable transmission mechanism and the forward-reverse changeover device, which rotational components including bearings; wherein, the hydraulic fluid passages for the drive pulley being arranged in such a manner that a first axial hole as a fluid passage being formed in the input shaft of the the forward-reverse changeover device and connected to a pressurized hydraulic fluid supply, a second axial hole as another fluid passage being formed in the drive shaft of the drive pulley and connected to the first axial hole formed in the input shaft, and anther fluid passage being provided to extend between the second axial hole formed in the drive shaft and the hydraulic fluid chamber of the drive pulley; and the lubricating fluid passages for the rotational components being arranged in such a manner that the lubricating fluid passages being provided in radially outer peripheral portions with respect to the input shaft and extending axially along the input shaft.

With the fluid passage arrangement in accordance with the invention, the hydraulic fluid passages for the drive pulley are placed in the input and drive shafts, while the lubricating fluid passages for the rotational components are placed in radially outer peripheral portions with respect to the input shaft, so that not only the rotational components can be supplied with lubricating fluid by simply manufacturable lubricating fluid passages due to arranging the lubricating fluid passages in radially outer peripheral portions with respect to the input shaft, but also a continuously variable transmission with smaller axial size can be consisted due to arranging axial holes in the input and drive shafts and excluding a pipe from the hydraulic fluid passages.

In a preferred embodiment in accordance with the invention, for the forward clutch the forward-reverse changeover device has a forward clutch drum placed in a radially outer peripheral space with respect to the input shaft and jointly-rotatably connected to the input shaft, while for rotatably supporting the drive shaft to the casing the continuously variable transmission mechanism has a ball bearing as one of the rotational components placed near the input shaft and the forward clutch drum; wherein, the forward clutch drum being connected to the input shaft in such a manner that the forward clutch drum being engaged to the input shaft with an engaging area between an inner circumferential part of the forward clutch drum and an outer circumferential part of the input shaft, by inserting the input shaft in an axial direction into the forward clutch drum; and, at least one of the lubricating fluid passages for the ball bearing being provided axially in the engaging area between the forward clutch drum and the input shaft.

With the preferred embodiment, due to at least one of the lubricating fluid passages being provided in the engaging area between the forward clutch drum and the input shaft, the ball bearing can be supplied with lubricating fluid by simply manufacturable lubricating fluid passages.

In a further preferred embodiment in accordance with the invention, the engaging area between an inner circumferential part of the forward clutch drum and an outer circumferential part of the input shaft has plural channels forming splines; wherein, the at least one of the lubricating fluid passages for the ball bearing being formed by the channels.

With the preferred embodiment, due to the at least one of the lubricating fluid passages being formed by at least one of the channels of the splines, the lubricating fluid passages for the ball bearing can be manufactured more simply.

In another preferred embodiment in accordance with the invention, a thrust bearing is provided adjacent to the ball bearing and forming another one of the lubricating fluid passages for the ball bearing; wherein, an outer race of the thrust bearing being radially extended so that a flange of the outer race being faced with the ball bearing, and the flange being axially extended to close a free edge of the flange to the ball bearing.

With the preferred embodiment, lubricating fluid flowing in the thrust bearing along the outer race is directed toward the ball bearing by the flange axially extending with the free edge closing to the ball bearing, so that the ball bearing is lubricated more efficiently.

BRIEF DESCRIPTION OF THE DRAWING

The present invention will be explained in further detail hereinafter, by referring to two preferred embodiments shown in the accompanying drawings, wherein:

FIG. 3 is an enlarged sectional view showing a preferred embodiment of a fluid passage arrangement for the continuously variable transmission shown in FIG. 1 and FIG. 2, in accordance with the present invention;

FIG. 4 is a cross sectional view showing a lubricating fluid passage provided in an engaging area between a forward clutch drum and an input shaft, taken on the line VI—VI in FIG. 3; and, FIG. 5 is an enlarged sectional view showing another embodiment of a fluid passage arrangement provided in a thrust bearing for the continuously variable transmission shown in FIG. 1 and FIG. 2, in accordance with the present invention.

DETAILED DESCRIPTION OF THE PREFERRED EMBODIMENTS

Figure 1:
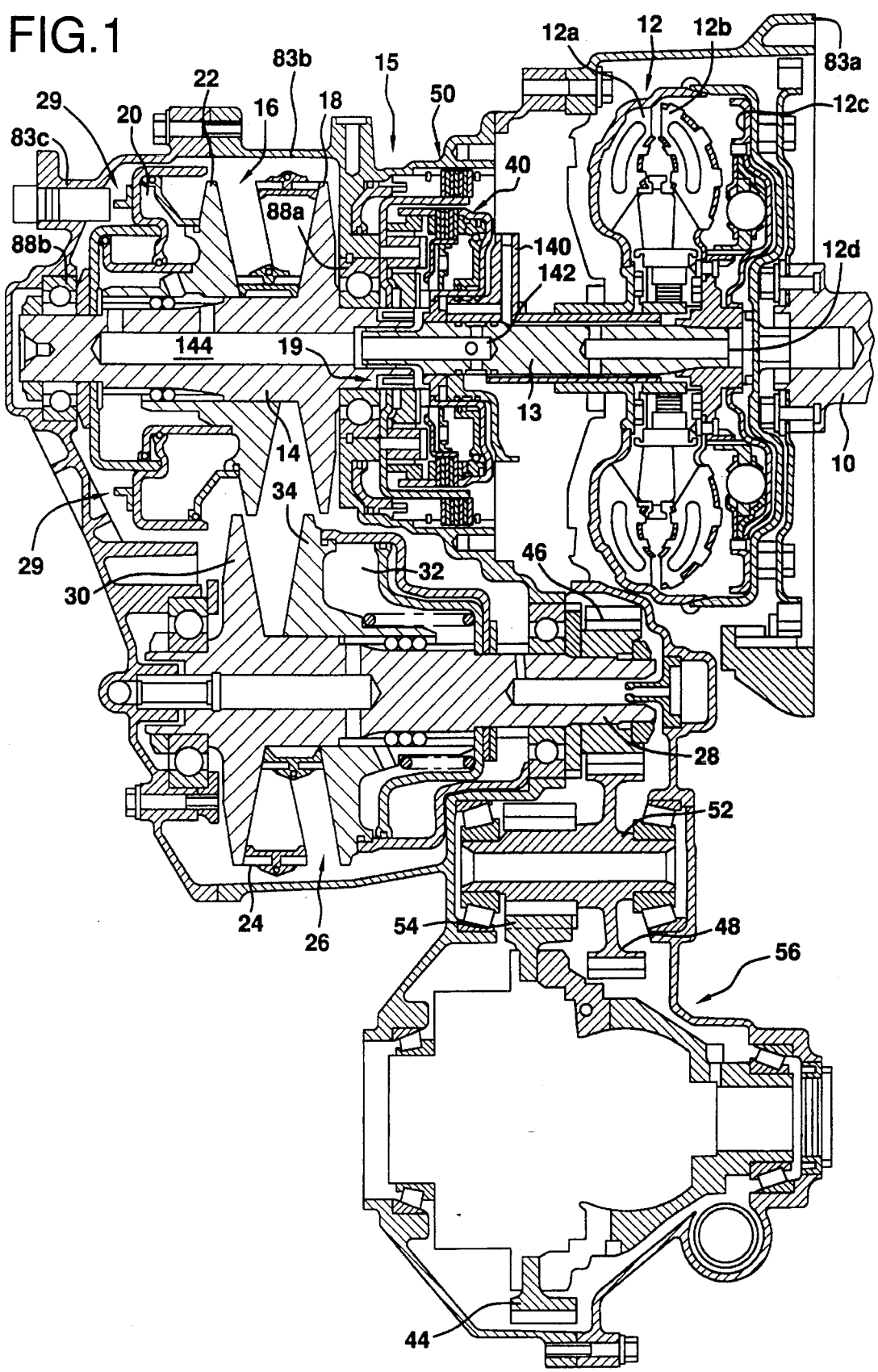
FIG. 1 is a sectional view showing a continuously variable transmission of an automotive vehicle.

Referring now to FIG. 1, there is shown an example of a continuously variable transmission of an automotive vehicle, for which a fluid passage arrangement in accordance with a preferred embodiment of the present invention is employed.

The continuously variable transmission comprises a torque converter 12, a forward-reverse changeover device 15, a V-belt type continuously variable transmission mechanism 29, a differential gearing device 56 and a casing 83 containing the torque converter 12, the forward-reverse changeover device 15, the transmission mechanism 29 and the differential gearing device The casing 83 consists of a housing 83a, a casing body 83b and a side cover 83c, all of which being separatably connected to each other by bolts. The housing 83a contains the torque converter 12, while the casing body 83b contains the forward-reverse changeover device 15, the continuously variable transmission mechanism 29, and the differential gearing device 56. The side cover 83c is placed at an opposite end of the casing 83 with respect to the housing 83a.

The torque converter 12 is associated with a lock-up clutch 12c which can mechanically connect an input pump-impeller 12a to a turbine runner 12b of the torque converter 12 and separate the input pump-impeller 12a from the turbine runner 12b by controlling hydraulic pressure in a lock-up chamber defined between the lock-up clutch 12c and a converter cover of the torque converter 12. The converter cover supporting the pump-impeller 12a is connected to an output shaft 10 of an engine (not-shown) as a power unit mounted on the automotive vehicle, while an output member 12d of the torque converter 12 is connected to an input shaft 13 of the forward-reverse changeover device 15. The torque converter 12 transmits rotational power between the engine and the forward-reverse changeover device 15, allowing rotation of the output shaft 10 of the engine despite of stop rotating condition of the input shaft 13, as a start assist device.

Figure 2:
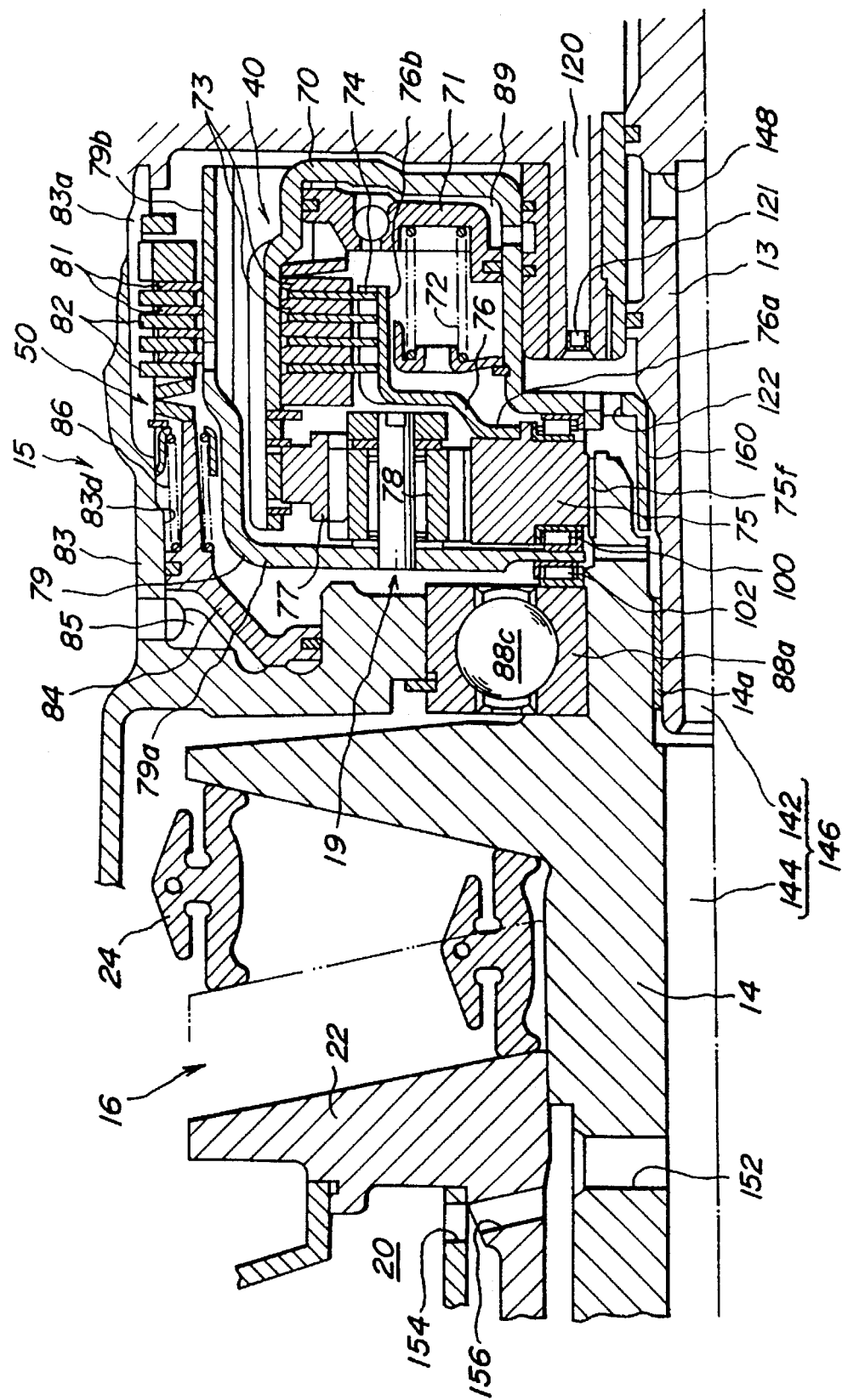
FIG. 2 is an enlarged sectional view showing a part of the continuously variable transmission shown in FIG. 1.

As shown in FIG. 2, the forward-reverse changeover device 15 comprises a planetary gearing 19, a forward clutch 40, a reverse brake 50 and the input shaft 13. The planetary gearing 19 consists of a sun gear 75, an internal gear 77, a pinion gear 78 and a carrier 79. The sun gear 75 is connected to an outer spline of a drive shaft 14 of the transmission mechanism 29 with an inner spline 75f, which drive shaft 14 being rotatably supported by a ball bearing 88a. The internal gear 77 is jointly-rotatably connected to a forward clutch drum 70 of the forward clutch 40. The pinion gear 78 is rotatably supported by the carrier 79, and engaged with both of the internal gear 77 and the sun gear 75. The input shaft 13 of the forward-reverse changeover device 15 and the drive shaft 14 of the transmission mechanism 29 are alined with each other along a common longitudinal central axis in the casing body 83b.

The forward clutch drum 70 is connected to the input shaft 13 by an engaging area between an inner circumferential part of the forward clutch drum 70 and an outer circumferential part of the input shaft 13, which engaging area having plural channels 70a, 70b, 13a forming splines as shown in FIG. 4 and further explained below. In the forward clutch drum 70, a clutch piston 71 is slidably fitted to define a hydraulic fluid chamber 89 between the forward clutch drum 70 and the clutch piston 71, and is always urged by return springs 72. The clutch piston 71 effects a pressing force to clutch plates 73, 74 for frictionally engaging the clutch plates 73, 74 with each other, opposing the return springs 72, owing to hydraulic fluid pressure supplied in the hydraulic fluid chamber 89. The clutch plates 73 and 74 are each arranged alternately, and the clutch plates 73 are jointly-rotatably connected to the forward clutch drum 70 by splines, while the clutch plates 74 are jointly-rotatably connected to a hub 76 by splines, which hub 76 being integrated with the sun gear 75.

The hub 76 is formed like a drum, consisting of a fixing part 76a and a cylindrical part 76b. The fixing part 76a is abutted on and fixed to an end surface 75c of the sun gear 75. The cylindrical part 76b is formed to be connected to an outer circumferential end of the fixing part 76a and extended away from the sun gear 75. The cylindrical part 76b of the hub 76 is provided with an outer spline for engaging with the clutch plates 74.

The carrier 79 is formed like a drum, consisting of a disk-like wall part 79a and a cylindrical part 79b. The wall part 79a extends perpendicular to an axial direction of the carrier 79. The cylindrical part 79b is formed to be connected to an outer circumferential end of the wall part 79a and extended surrounding the forward clutch drum 70. An outer spline of the cylindrical part 79b is engaged with an inner spline of clutch plates 81, each of which is arranged alternately with clutch plates 82, in turn, and an outer spline of the clutch plates 82 is engaged with an inner spline of the casing 83. The clutch plates 81, 82 can be effected a pressing force from a brake piston 84 of the reverse brake 50.

The brake piston 84 is slidably fitted in a cylinder 83d formed in the casing 83, defining a hydraulic fluid chamber 85 between the brake piston 84 and the cylinder 83d, and is always urged by return springs 86. The brake piston 84 effects a pressing force to the clutch plates 81, 82 for frictionally engaging the clutch plates 81, 82 with each other, opposing the return springs 86, owing to hydraulic fluid pressure supplied in the hydraulic fluid chamber 85.

A roller type first thrust bearing 100 is provided at an inside of the carrier 79, between an inner circumferential portion of the wall part 79a and the sun gear 75, while a roller type second thrust bearing 102 is provided at an outside of the carrier 79, between the inner circumferential portion of the wall part 79a and the ball bearing 88a. Thus, the planetary gearing 19 of the forward-reverse changeover device 15 is placed in a radially outer peripheral space with respect to the input shaft 13, surrounding the input shaft 13.

When driving the automotive vehicle forward, the forward clutch 40 is engaged, so that the clutch plates 73, 74 are frictionally engaged, connecting the forward clutch drum 70 and the internal gear 77 to the sun gear 75 through the hub 76, while the reverse brake 50 is released, allowing free rotation of the carrier 79 relative to the casing 83, so that the internal gear 77 and the sun gear 75 are jointly rotated with the forward clutch drum 70, transmitting rotation of the input shaft 13 to the drive shaft 14 directly as it is.

On the other hand, when driving the automotive vehicle backward, the reverse brake 50 is engaged, so that the clutch plates 81, 82 are frictionally engaged, connecting the carrier 79 to the casing 83, while the forward clutch 40 is released, allowing rotation of the forward clutch drum 70 and the internal gear 77 relative to the sun gear 75, so that the sun gear 75 is reversely rotated relative to the forward clutch drum 70 and the internal gear 77, transmitting rotation of the input shaft 13 to the drive shaft 14 with reversed rotating direction.

The V-belt type continuously variable transmission mechanism 29 comprises the above-mentioned drive shaft 14, a drive pulley 16 coaxially and jointly-rotatably connected to and supported by the drive shaft 14, a driven shaft 28 placed parallel to the drive shaft 14, a driven pulley 26 coaxially and jointly-rotatably connected to and supported by the driven shaft 28, and an endless V-belt 24 passed for transmitting power between the pulleys 16, 26. The drive shaft 14 is rotatably supported by the casing 83 through the ball bearing 88a and a ball bearing 88b, which ball bearing 88b being placed at an inside of the side cover 83c, while the driven shaft 28 is rotatably supported by the casing 83 through ball bearings similarly to the drive shaft 14.

The drive pulley 16 has a stationary conical member 18 integrated with the dive shaft 14, a movable conical member 22 slidable on the drive shaft 14, and a hydraulic fluid chamber 20. The movable conical member 22 is opposite to the stationary conical member 18, forming a V-groove with the stationary conical member 18, and slid with a piston in the hydraulic fluid chamber 20 for changing width of the V-groove by hydraulic fluid pressure supplied in the hydraulic fluid chamber 20. The driven pulley 26 has a stationary conical member 30 integrated with the driven shaft 28, a movable conical member 34 slidable on the driven shaft 28, and a hydraulic fluid chamber 32. The movable conical member 34 is opposite to the stationary conical member 30, forming a V-groove with the stationary conical member 30, and slid with a piston in the hydraulic fluid chamber 32 for changing width of the V-groove by hydraulic fluid pressure supplied in the hydraulic fluid chamber 32. The hydraulic fluid pressure is supplied in the hydraulic fluid chambers 20, 32 so that a rotational speed ratio between the pulleys 16, 26 is continuously varied.

The differential gearing device 56 comprises a gearing consisting of a drive gear 46 jointly-rotated with the driven shaft 28, an idle gear 48 integrated with an idle shaft 52 and engaged with the drive gear 46, a pinion gear 54 jointly-rotatably connected to the idle shaft 52, and a final gear jointly-rotatably connected to and supported by a casing of a known differential gearing (not-shown) and engaged with the pinion gear 54 for driving front and/or rear wheels (not-shown) of the automotive vehicle. Thus, the continuously variable transmission is capable of transmitting rotational power from the engine to the wheels so as to drive the automotive vehicle, with a desired rotational speed ratio and a desired rotational direction.

The continuously variable transmission further comprises an oil pump 140 (shown at right side of the forward clutch 40 in FIG. 1) driven by the input shaft 13 and sucking operating oil from an oil tank (not-shown). The operating oil pressurized and discharged by the oil pump 140 is supplied, as hydraulic fluid, to the hydraulic fluid chambers 20, 32 through a control valve (not-shown) and hydraulic fluid passages including a hydraulic fluid passage 146 (shown in FIG. 2) formed in the input shaft 13 and the drive shaft 14. The operating oil pressurized and discharged by the oil pump 140 is further supplied, as lubricating fluid, to the forward-reverse changeover device 15, the transmission mechanism 29, etc., through lubricating fluid passages including a lubricating fluid passage 160 (shown in FIG. 2) formed in the engaging area between the forward clutch drum 70 and the input shaft 13.

As shown in FIG. 2, the hydraulic fluid passage 146 for supplying hydraulic fluid to the hydraulic fluid chamber 20 is arranged in such a manner that an axial hole 142 as a fluid passage is drilled in the input shaft 13 and another axial hole 144 as anther fluid passage is drilled in the drive shaft 14 so that the latter axial hole 144 is connected to the former axial hole 142. Thus, the operating oil as hydraulic fluid, pressurized by the oil pump 140, flows into the hydraulic fluid passage 146 through the control valve and oil holes 148 (one of which is shown in FIG. 2), then passes through oil holes 152, 156, 154 and flows into the hydraulic fluid chamber 20 of the drive pulley 16 providing a pressing force (directing rightward in FIG. 1) to the movable conical member 22 so as to slide the movable conical member 22 toward the stationary conical member 18. A stable position of the movable conical member 22 is settled based on balancing of the pressing force provided by the operating oil and a pressing force provided by the V-belt 26, and the rotational speed ratio between the pulleys 16, 26 is settled according to the stable position of the movable conical member 22. For preventing pressure reduction of the operating oil in the hydraulic fluid passage 146, a plain bearing 14a is provided between the input shaft 13 and the drive shaft 14, through which bearing 14a the input shaft 13 is supported by the drive shaft 14.

The operating oil as lubricating fluid, pressurized by the oil pump 140, flows into a central depression of the forward clutch drum 70 through an oil passage 120 and an orifice 121 as fluid passages, then passes through oil holes 122 (one of which is shown in FIG. 2) as fluid passages and distributed radiately in the forward clutch drum 70, due to a centrifugal force brought by rotation of the sun gear 75, so that the planetary gearing 19 and the forward clutch 40 are lubricated with the operating oil.

As shown in FIG. 3, a part of the operating oil flowing into the central depression of the forward clutch drum 70, passes through the lubricating fluid passage 160 formed between the forward clutch drum 70 and the input shaft 13, oil holes 162 (one of which is shown in FIG. 3) as fluid passages drilled radially in the drive shaft 14, and the second thrust bearing 102 as a fluid passage, so that the ball bearing 88a for the drive shaft 14 is also lubricated with the operating oil.

Referring now to FIG. 4, the lubricating fluid passage 160 is arranged in such a manner that in the engaging area an outer circumferential part of the input shaft 13 is provided with axially extending plural channels 13a forming a spline, while an inner circumferential part of the forward clutch drum 70 is provided with two kinds of axially extending plural channels 70a, 70b forming another spline. Width of the first channel 70a corresponds to that of the channel 13a, while width of the second channel 70b is larger than that of the channel 13a. Each projecting part between neighboring channels 13a of the input shaft 13 is engaged in each of the first channels 70a, while a plural of the projecting parts of the input shaft 13 is engaged in each of the second channels 70b. Thus, the lubricating fluid passage 160 is formed by the channels 13a placed in the second channels 70b, since the forward clutch drum 70 being engaged with the input shaft 13 through the splines.

Therefore, with the preferred embodiment, not only the rotational components can be supplied with operating oil by simply including lubricating fluid passages, including the oil passage 120, the orifice 121 and the passage 160, due to the arrangement of the lubricating fluid passages arranged in radially outer peripheral portions with respect to the input shaft 13, but also the continuously variable transmission with smaller axial size can be consisted, due to the arrangement of the axial holes 142, 144 arranged in the input and drive shafts 13, 14 for supplying the pressurized operating oil without axial bulging of the side cover 83c, since a pipe from the hydraulic fluid passages is excluded.

Further in this embodiment, as shown in FIG. 3, an outer race 102a of the second thrust bearing 102 is radially extended relatively to an inner race 102c so that a flange 102b of the outer race 102a is faced with the ball bearing 88a, and the flange 102b is axially extended so that a free edge of the flange 102b is close to the ball bearing 88a.

Thus, the operating oil, as lubricating fluid, flowing in the second thrust bearing 102 along an inner surface of the outer race 102a, is directed toward the ball bearing 88a by the flange 102b, so that the ball bearing 88a is lubricated by the operating oil more efficiently.

FIG. 5 shows another embodiment of a fluid passage arrangement provided in a thrust bearing for the continuously variable transmission shown in FIG. 1 and FIG. 2, in accordance with the present invention.

In this embodiment, a washer 170 as a plain type thrust bearing is provided between the inner circumferential portion of the wall part 79a of the carrier 79 and the ball bearing 88a, instead of the roller type second thrust bearing 102. The washer 170 is a ring-like member, which may be formed from, for example, hard plastic material. The washer 170 has a sliding surface 170a facing to the ball bearing 88a, and another sliding surface 170b facing to the carrier 79, each of which sliding surfaces 170a, 170b has a contour for improving abrasion-resistance. The sliding surface 170a is formed with plural oil channels 170c (one of which is shown in FIG. 5) extending radially from a center of the washer 170 so that a flange 170d of the washer 170 faces the ball bearing 88a.

With this embodiment, the operating oil, as lubricating fluid, flowing in the oil channels 170c of the washer 170, is directed toward the ball bearing 88a by the flange 170d, so that the ball bearing 88a is lubricated efficiently by the operating oil, similarly to the case of the second thrust bearing 102.

It is of course that the present invention is not limited to the above-mentioned embodiments only, and various modifications and/or alterations may be made without departing from a scope of the invention. For example, the input shaft 13 may be provided with axial channels having larger width, instead of the forward clutch drum 70, so as to contain a plural of axial channels of the forward clutch drum 70. Further, the input shaft 13 and the forward clutch drum 70 may be connected with serrations, instead of splines.

I claim:

1. A continuously variable transmission for an automotive vehicle comprising:

a V-belt type continuously variable transmission mechanism having a drive pulley, a driven pulley, and an endless V-belt, each width of V-grooves of which pulleys being changeable for continuously varying a rotational speed ratio between the pulleys by supplying pressurized hydraulic fluid to actuate a piston in a hydraulic fluid chamber of at least the drive pulley, and between which drive and driven pulleys the V-belt being passed for transmitting power between said pulleys;

a forward-reverse changeover device having a planetary gearing, a forward clutch, a reverse brake, and an input shaft, which planetary gearing receiving rotational power through the input shaft and providing the rotational power to the drive pulley of said transmission mechanism through a drive shaft connected to and carrying the drive pulley, and which planetary gearing changing over a rotational direction of the drive shaft between the same and a counter direction relative to a rotational direction of the input shaft by selectively actuating the forward clutch or the reverse brake;

a start assist device transmitting rotational power between a power unit and the input shaft of said forward reverse changeover device, allowing rotation of an output shaft of the power unit despite of stop rotating condition of the input shaft;

a casing containing said transmission mechanism, said start assist device, and said forward-reverse changeover device so that the input shaft of said forward-reverse changeover device and the drive shaft of said drive pulley are aligned along a common longitudinal central axis; and a fluid passage arrangement having hydraulic fluid passages for the drive pulley, and lubricating fluid passages for rotational components of said continuously variable transmission mechanism and said forward-reverse changeover device, which rotational components including bearings, wherein said hydraulic fluid passages for the drive pulley are arranged so that a first axial hole as a fluid passage is formed in the input shaft of the forward-reverse changeover device and connected to a pressurized hydraulic fluid supply, a second axial hole as another fluid passage is formed in the drive shaft of the drive pulley and connected to the first axial hole formed in the input shaft, and another fluid passage is provided to extend between the second axial hole formed in the drive shaft and the hydraulic fluid chamber of the drive pulley, and wherein said lubricating fluid passages for the rotational components are arranged so that the lubricating fluid passages are provided adjacent to and on radially outer side of the input shaft and extend axially along the input shaft.

2. A continuously variable transmission for an automotive vehicle comprising:

a V-belt type continuously variable transmission mechanism having a drive pulley, a driven pulley, and an endless V-belt, each width of V-grooves of which pulleys being changeable for continuously varying a rotational speed ratio between the pulleys by supplying pressurized hydraulic fluid to actuate a piston in a hydraulic fluid chamber of at least the drive pulley, and between which drive and driven pulleys the V-belt being passed for transmitting power between said pulleys;

a forward-reverse changeover device having a planetary gearing, a forward clutch, a reverse brake, and an input shaft, which planetary gearing receiving rotational power through the input shaft and providing the rotational power to the drive pulley of said transmission mechanism through a drive shaft connected to and carrying the drive pulley, and which planetary gearing changing over a rotational direction of the drive shaft between the same and a counter direction relative to a rotational direction of the input shaft by selectively actuating the forward clutch or the reverse brake;

a start assist device transmitting rotational power between a power unit and the input shaft of said forward reverse changeover device, allowing rotation of an output shaft of the power unit despite of stop rotating condition of the input shaft;

a casing containing said transmission mechanism, said start assist device and said forward-reverse changeover device so that the input shaft of said forward-reverse changeover device and the drive shaft of said drive pulley are aligned along a common longitudinal central axis; and a fluid passage arrangement having hydraulic fluid passages for the drive pulley, and lubricating fluid passages for rotational components of said continuously variable transmission mechanism and said forward-reverse changeover device, wherein said forward-reverse changeover device has a forward clutch drum for the forward clutch, which forward clutch drum being placed in a radially outer peripheral space with respect to the input shaft and jointly-rotatably connected to the input shaft so that the forward clutch drum is engaged to the input shaft with an engaging area between an inner circumferential part of the forward clutch drum and an outer circumferential part of the input shaft by insertion of the input shaft in an axial direction into the forward clutch drum, wherein said continuously variable transmission mechanism includes, as one of the rotational components, a ball bearing for rotatably supporting the drive shaft to said casing, the ball bearing being placed near the input shaft and the forward clutch drum, wherein said hydraulic fluid passages for the drive pulley are arranged so that a first axial hole as a fluid passage is formed in the input shaft of the forward-reverse changeover device and connected to a pressurized hydraulic fluid supply, a second axial hole as another fluid passage is formed in the drive shaft of the drive pulley and connected to the first axial hole formed in the input shaft, and another fluid passage is provided to extend between the second axial hole formed in the drive shaft and the hydraulic fluid chamber of the drive pulley, wherein said lubricating fluid passages for the rotational components are arranged so that the lubricating fluid passages are provided adjacent to and on radially outer side of the input shaft and extend axially along the input shaft, and wherein at least one of said lubricating fluid passages is provided axially in the engaging area between the forward clutch drum and the input shaft for lubricating said ball bearing placed near the input shaft and the forward clutch drum.

3. A continuously variable transmission for an automotive vehicle as set forth in claim 2, wherein said engaging area between the forward clutch drum and the input shaft has plural channels forming splines and wherein said at least one of the lubricating fluid passages for lubricating said ball bearing is formed by said channels.

4. A continuously variable transmission for an automotive vehicle as set forth in claim 2, wherein a thrust bearing is provided adjacent to said ball bearing, and including another one of said lubricating fluid passages for lubricating said ball bearing and wherein an outer race of said thrust bearing is radially extended so that a flange of the outer race faces said ball bearing and the flange is axially extended to close a free edge of the flange to said ball bearing.

* * * * *